(12) United States Patent
Thomas et al.

(10) Patent No.: US 10,101,963 B2
(45) Date of Patent: Oct. 16, 2018

(54) SENDING AND RECEIVING DATA BETWEEN PROCESSING UNITS

(71) Applicant: Hewlett Packard Enterprise Development LP, Houston, TX (US)

(72) Inventors: Eric Thomas, Windsor, CO (US); Jennifer Veronica Hack, Ft. Collins, CO (US); David Maciorowski, Longmont, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 256 days.

(21) Appl. No.: 15/238,240

(22) Filed: Aug. 16, 2016

(65) Prior Publication Data
US 2018/0052659 A1  Feb. 22, 2018

(51) Int. Cl.
| G06F 13/36 | (2006.01) |
| G06F 9/46 | (2006.01) |
| G06F 5/06 | (2006.01) |
| G06F 13/16 | (2006.01) |
| G06F 13/40 | (2006.01) |

(52) U.S. Cl.
CPC .......... *G06F 5/065* (2013.01); *G06F 13/1673* (2013.01); *G06F 13/404* (2013.01); *G06F 2205/067* (2013.01)

(58) Field of Classification Search
None
See application file for complete search history.

(56) References Cited

U.S. PATENT DOCUMENTS

| 5,790,851 A * | 8/1998 | Frank ...................... G06F 9/52 718/100 |
| 7,743,234 B2 | 6/2010 | Bohizic |
| 2002/0112100 A1 | 8/2002 | Zimmerman |
| 2009/0031315 A1* | 1/2009 | Inoue ..................... G06F 9/461 718/102 |
| 2011/0125974 A1* | 5/2011 | Anderson ............ G06F 12/084 711/153 |
| 2011/0271060 A1 | 11/2011 | Richardson |

(Continued)

OTHER PUBLICATIONS

Nick Piggin, "A Lockless Pagecache in Linux," Nov. 2006, 92 pps., <ttps://cs.anu.edu.au/people/Eric.McCreath/students/NickPiggin2006Thesis.pdf >.

*Primary Examiner* — Hyun Nam
(74) *Attorney, Agent, or Firm* — Hewlett Packard Enterprise Patent Department

(57) ABSTRACT

Some examples comprise a memory device including a memory region accessible by a receiving processing unit and a plurality of sending processing units, the memory region including a set of memory buffers identified by a set of buffer identifiers; a first FIFO buffer for communicating a first buffer identifier from the receiving processing unit to any of the sending processing units, the first buffer identifier corresponding to a memory buffer available for use by the any one sending processing unit in sending data to the receiving processing unit; and a second FIFO buffer for communicating a second buffer identifier to the receiving processing unit from any of the sending processing units, the second buffer identifier corresponding to a memory buffer containing data being sent to the receiving unit.

20 Claims, 5 Drawing Sheets

(56) References Cited

U.S. PATENT DOCUMENTS

| | | |
|---|---|---|
| 2011/0296437 A1 | 12/2011 | Raut |
| 2013/0039207 A1* | 2/2013 | Vadasz ............... H04L 12/5601 370/252 |
| 2014/0019982 A1* | 1/2014 | John ...................... G06F 9/544 718/102 |
| 2015/0234612 A1 | 8/2015 | Himelstein |
| 2015/0331720 A1* | 11/2015 | Huetter .................. G06F 9/544 718/104 |
| 2017/0300228 A1* | 10/2017 | Gollapudi ............... G06F 3/061 |

* cited by examiner

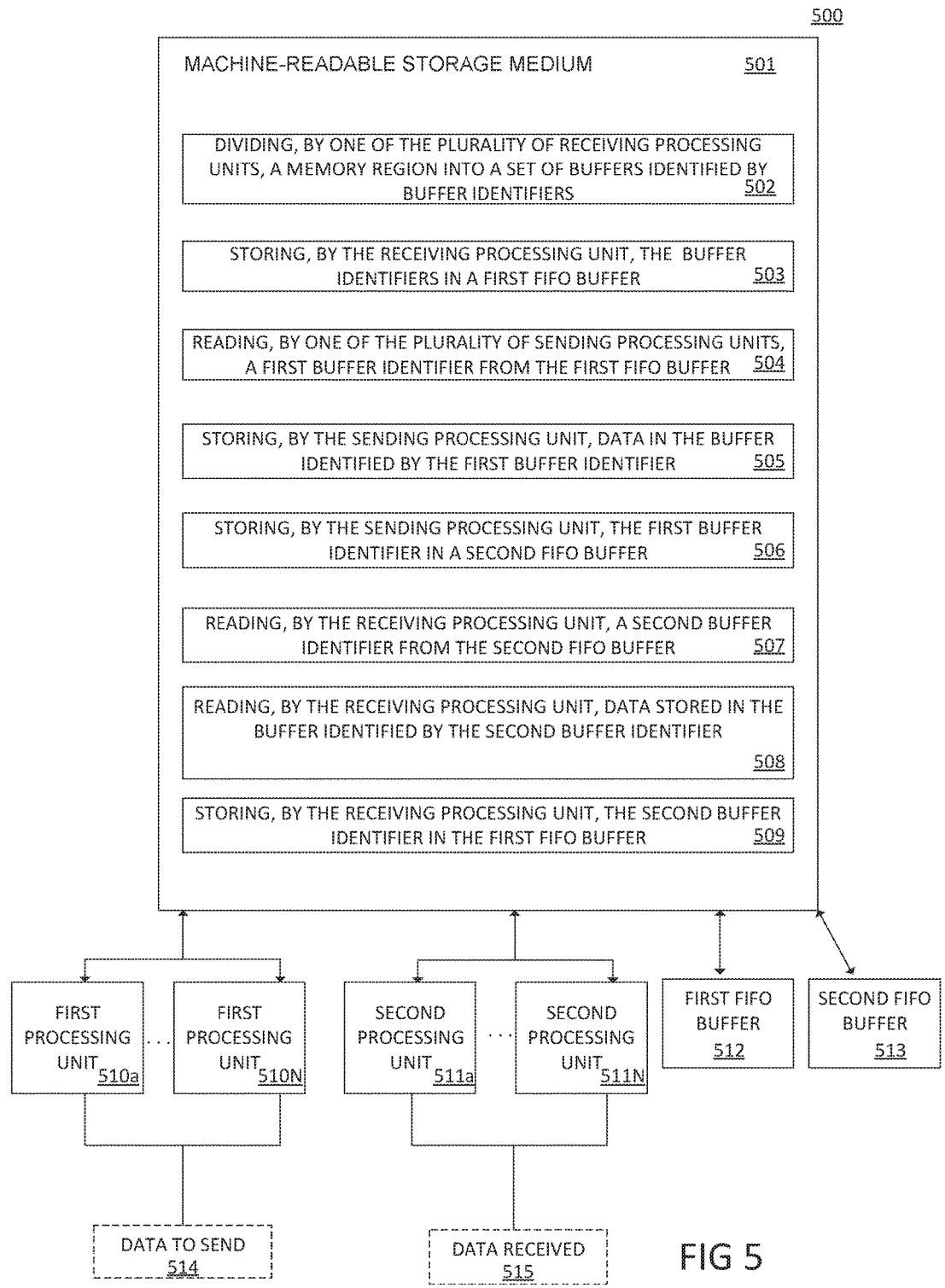

SENDING AND RECEIVING DATA BETWEEN PROCESSING UNITS

BACKGROUND

Distributed computing systems are widely used in telecommunications networks, network applications, real-time process control application or parallel computation. The distributed computing systems are systems in which the computing elements of the systems communicate and coordinate their actions by passing messages to interact to achieve a common goal. These distributed systems may comprise a plurality of processing units working simultaneously to perform a common task. The information exchanged between processing units may be temporarily stored in a common memory area. The processing units may use locking mechanisms or interrupt mechanisms to coordinate the performance of the common tasks which may negatively impact the global performance of the distributed computing system.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
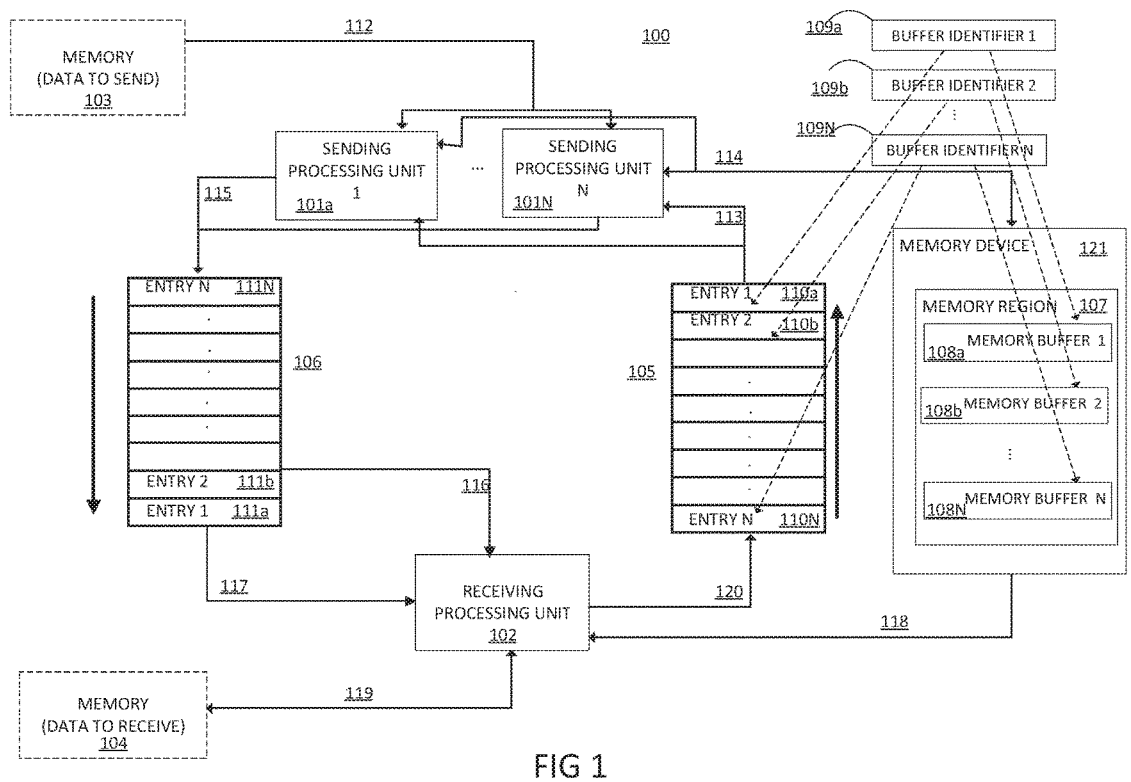
FIG. 1 is a block diagram of an example of a system for sending data from a plurality of sending processing units to a receiving processing unit, the system including 2 first-in-first-out (FIFO) buffers and a commonly accessible memory device.

The distributed computing systems are systems in which the computing elements of the systems communicate and coordinate their actions by passing messages to achieve a common goal. These distributed systems range from personal computers featuring two processing units to large-scale distributed processing systems comprising a plurality of processing units working simultaneously to perform extremely complicated tasks. Generally, in such distributed computing systems, each processing unit is able to send data to each other processing unit in order to coordinate the performance of the tasks.

The information exchanged between processing units may be temporarily stored in a commonly accessible memory region. The commonly accessible memory region may be a separate physical memory device dedicated for the purpose of coordinating intercommunications between processing units or may be a portion of a larger memory device that is also used for other tasks. In prior solutions, this commonly accessible memory region was used as a ring buffer where data was written in variable lengths to allocated buffers.

Using a ring buffer as a commonly accessible memory region presents many disadvantages, including the locking of the entire ring buffer when one of its buffers is allocated and the processing unit using said buffer is stalled or exits; the inefficiencies derived from the fact that it takes several reads and writes to understand the position of the next buffer and then to indicate that it has been allocated and is in use; and the fact that interrupt signals for notifications are useless if a buffer of the ring buffer is blocked. It may also happen that, for example, when the Central Processing Unit (CPU) of the System firmware writes data faster than is read by the CPU of the Management firmware, the common memory area will fill not allowing the CPU of the System firmware to keep writing data until space in the memory is released by the CPU of the Management firmware. Besides, the processing units may use locking mechanisms or interrupt mechanisms to coordinate the performance of the common tasks which may negatively impact the global performance of the distributed computing system. These disadvantages may result in resource loss and computational underutilization of the distributed computing systems.

Other prior solutions may use a dedicated communications channel between each pair of communicating processing units, e.g., between each pair of sending processing unit-receiving processing unit. However, these solutions are resource intensive since they require separate buffers, memories, etc, for every pair of communicating processing units.

Examples herein described provides a luckless mechanism to transfer variable size data between processing units that allows each processing unit to operate atomically and independently from each other by avoiding the need to block or coordinate. It allows for the transfer of variable size data between a plurality of sending processing units and one or more receiving processing units, not in the same memory domain, by making use of two unidirectional atomically accessed FIFO buffers and a commonly accessible memory device, and without the need for resource locking.

The lockless data exchange between processing units herein described allows working with both similar processing units as well as dissimilar processing units. It further avoids the need of locking of any resources at any time of the data exchange process since any single FIFO buffer or memory buffer is written or read by only one processing unit at a time. The solution additionally avoids the need for any of the processing units to block or coordinate with each other by making use of 2 unidirectional atomically accessed FIFO buffers, such that the processing units do not need to coordinate or synchronize their operations during execution of the data exchange process.

The following provides a detailed description of examples illustrated by FIGS. 1-5.

FIG. 1 is a block diagram of an example of a system 100 for data exchange between a plurality of sending processing units 101a-101N, in which N represents an integer value greater than one, and a receiving processing unit 102. The term "data", as used herein, may include all forms of digital information, such as file system data, variables, parameters, messages or the like, produced or stored by a computing element such as a computer, server, processor, etc.

As used herein, the "processing units" may be any type of electronic circuitry within a computing device that carries out the instructions of a computer program by performing basic arithmetic, logical, control and input/output (I/O) operations specified by the instructions, wherein these instruction may be embodied in code. The "processing units" may include, for example, a central processing unit (CPU), a semiconductor-based microprocessor, an application specific integrated circuit (ASIC), a graphical processing unit (GPU), or other hardware device suitable for retrieval and execution of instructions stored in a machine-readable storage medium. The hardware of the "processing units" may be substantially similar or may differ from one another. In some other examples, the processing units may be logical threads of execution within a CPU or may be remote processing units using a local proxy to access a local system.

The system 100 further includes a memory device 121 comprising a memory region 107 commonly accessible for the plurality of sending processing units 101a-101N and the receiving processing unit 102, which may be utilized as will be described below. The memory device 121 may be a separate physical memory dedicated for the purpose of coordinating processing unit communications or may be a portion of a larger memory that is also used for other tasks, such as a partition of a hard drive or a segment of a computer's RAM. Data may be passed among the any of the sending processing units 101a-101N, the receiving processing unit 102, and the memory region 107 by way of a bus (not shown in the figures).

In this example, the receiving processing unit 102 establishes a channel to exchange data with the plurality of sending processing units 101a-101N by dividing the memory region 107 into a plurality of memory buffers 108a-108N, in which N represents an integer value greater than one, and assigns a buffer identifier 109a-109N, in which N represents an integer value greater than one, to each one of the memory buffers 108a-108N. The buffer identifiers 109a-109N may be selected among a memory address pointing to each memory buffer, a memory offset pointing to each memory buffer and a unique identifier for each memory buffer, e.g. a memory block descriptor for each memory partition corresponding to a single memory buffer. These memory buffers 108a-108N temporarily store the data to be transferred from the sending processing units 101a-101N to the receiving processing unit 102. The memory buffers 108a-108N may be of a single fixed size or may differ for the performance of differing types of tasks.

The system 100 further comprises two atomically readable and writable FIFO buffers 105-106, one in each direction. The first FIFO buffer 105 is written by the receiving processing unit 102 and is read by the plurality of sending processing units 101a-101N and the second FIFO buffer 106 is written by the plurality of sending processing units 101a-101N and is read by the receiving processing unit 102.

The first FIFO buffer 105 comprises a plurality of entries 110a-110N, in which "N" represents an integer value greater than one. The second FIFO buffer 106 comprises a plurality of entries 111a-111N, in which "N" represents an integer value greater than one. The two FIFO buffers 105-106 are read as an atomic access to a single location where the oldest written entry is read first. Thus, the plurality of sending processing units 101a-101N will only read the oldest written entry 110a of the first FIFO buffer 105 and the receiving processing unit 102 will only read the oldest written entry 111a of the second FIFO buffer 106. The buffer identifiers 109a-109N assigned to the memory buffers 108a-108N are pre-populated into the first FIFO buffer 105 by the receiving processing unit 102. In some other examples, when the memory buffers 108a-108N have different size, the receiving processing unit 102 may populate each buffer identifier 109a-109N with a size designator of the memory buffer 108a-108N to which it refers as a single combined quantity into the first FIFO buffer 105. The entries 110-111 may store with the buffer identifiers 109a-109N a key access code to allow access to the memory buffers 108a-108N to which the buffer identifiers 109a-109N refer. This key access code prevents access to memory buffers accidentally or maliciously by processing units which have not obtained the buffer identifier from the FIFO buffers 105-106. The entries 111a-11N of the second FIFO buffer 106 may further store a key code, such an encryption key code, which is used by the receiving processing unit 102 to interpret the data stored in the memory buffers 108a-108N.

Then, one of the sending processing units 101a-101N, for example sending processing unit 101a, receives 112 the data to be sent to the receiving processing unit 102 from a memory 103. This memory 103, which in this example does not belong to the system 100, may be an external memory or an internal memory of a computing system, such a computer, server or similar, or may belong to the sending processing unit 101a itself. Said sending processing unit 101a reads a buffer identifier 109a from the first FIFO buffer 105 and writes the data in the memory buffer associated to the read buffer identifier 109a, in this particular case in memory buffer 108a, up its maximum size. After that, the sending processing unit 101a writes the buffer identifier 109a into the second FIFO buffer 106. The sending processing unit 101a may also write a size designator of the data stored in each one of the memory buffers 108a-108N together with the corresponding buffer identifier 109a-109N as a single combined quantity into the second FIFO buffer 106. At this point of the process, this sending processing unit 101a may continue writing further data in additional memory buffers 108b-108N of the memory region 107 or may be free to carry out other tasks.

When data is present in the second FIFO buffer 106, an interrupt signal is automatically activated 116 by the second FIFO buffer 106. The interrupt signal, which is always active when there is data available in the second FIFO buffer 106, may be a level-triggered signal or an edge triggered signal. This interrupt signal triggers the receiving processing unit 102 to read 117 the oldest entry 111a from the second FIFO buffer 106, to access 118 the data stored in the memory buffer 108a pointed by the read buffer identifier 109a and to store 119 the data in a memory 104. This memory 104, which in this example does not belong to the system 100, may be an external memory or an internal memory of a computing system, such a computer, server or the like, or may belong to the receiving processing unit 102 itself. Then, the receiving processing unit 102 writes 120 the buffer identifier 109a into the first FIFO buffer 105. Once the second FIFO buffer 106 is empty, the interrupt signal is cleared or deactivated by the second FIFO buffer 106 and the receiving processing unit 102 is then free to carry out other tasks. In this way, the plurality of sending processing units 101a-101N and the receiving processing unit 102 do not need to coordinate or synchronize their operation with each other avoiding locks and bottlenecks during execution. The receiving processing unit 102 is responsible for managing enable and disable interrupt interactions during the interrupt service routine executed in response to receiving the interrupt signal.

The first FIFO buffer 105 may also automatically activate an interrupt signal when there is at least one entry 110a-110N storing a buffer identifier 109a-109N. It indicates that there is at least one memory buffer 108a-108N available to be written by any of the sending processing units 101a-101N. This interrupt signal may be a level-triggered signal or an edge triggered signal. The interrupt signal may be cleared or deactivated by the first FIFO buffer 105 when the first FIFO buffer 105 is empty.

Both, the first FIFO buffer 105 and the second FIFO buffer 106 may implement other mechanisms than interrupt signals, such as notifications, to trigger the plurality of sending processing unit 101a-101N or the receiving processing unit 102 to read the first and second FIFO buffers 105-106.

The plurality of sending processing units 101a-101N and the receiving processing unit 102 may use a remote access system or a proxy access system to access the first and second FIFO buffers 105-106 and the memory region 107.

Simultaneously or sequentially to the operations carried out by the sending processing unit 101a, other sending processing units 101b-101N may be writing 114 additional data 103 in additional free memory buffers 108b-108N and writing 115 corresponding buffer identifiers 109b-109N pointing to said free memory buffers 108b-108N to the second FIFO buffer 106.

The functioning of the plurality of sending processing units 101a-101N is independent from the functioning of the receiving processing unit 102.

In some other examples, the first FIFO buffer 105 and the second FIFO buffer 106 may comprise a respective first register storing the maximum number of entries forming the corresponding first and second FIFO buffer 105,106. In some other examples, the first FIFO buffer 105 and the second FIFO buffer 106 may also comprise a respective second register storing the respective number of entries in the corresponding first and second FIFO buffer 105,106 that store a buffer identifier at a particular moment in time. This second register provides information to the sending processing units 101a-101N and to the receiving processing unit 102 about the number of entries available to be read in the FIFO buffers 105,106. In some other examples, each one of the memory buffers of the set of memory buffers 108a-108N in the memory region 107 comprises a buffer size register to store the maximum size of the memory buffer. In some other examples, the sending processing units 101a-101N store the size of the data contained in a particular memory buffer 108a-108N together with the corresponding buffer identifier in the second FIFO buffer 106.

In some other examples, the second FIFO buffer 106 may comprise steering bits to allow the sending processing units 101a-101N to hint at a destination for the data in the second FIFO buffer 106.

In some other examples, the first FIFO buffer 106 may comprise a first notification generation module to notify the sending processing units 101a-101N that there is at least one buffer identifier 109a-109N stored in the first FIFO buffer 106. This notification may indicate to the sending processing units 101a-101N that there is at least one buffer identifier 109a-109N, and thus a memory buffer 108a-108N, available to be used to store data to be send to the receiving processing units 102a-102N.

In some other examples, the second FIFO buffer 107 may comprise a second notification generation module to notify the receiving processing unit 102 that there is at least one buffer identifier 109a-109N to be read from the second FIFO buffer 107. This notification may indicate to the receiving processing unit 102 that there is at least one buffer identifier 109a-109N, and thus a memory buffer 108a-108N, available to be read with data previously stored by the sending processing units 102a-102N.

In some other examples, the second FIFO buffer 107 may comprise an encoding module to encode the data stored in the second FIFO buffer 107 and the receiving processing unit 102 may comprise a decoding module to decode the read data from the second FIFO buffer 107.

Similarly, in systems with more than one receiving processing unit, said plurality of sending and receiving processing units only need two FIFO buffers and a commonly accessible memory region to exchange data in one direction, i.e., from the sending processing units to the receiving processing units, without need to coordinate or synchronize their operation with each other and avoiding locks.

Figure 2:
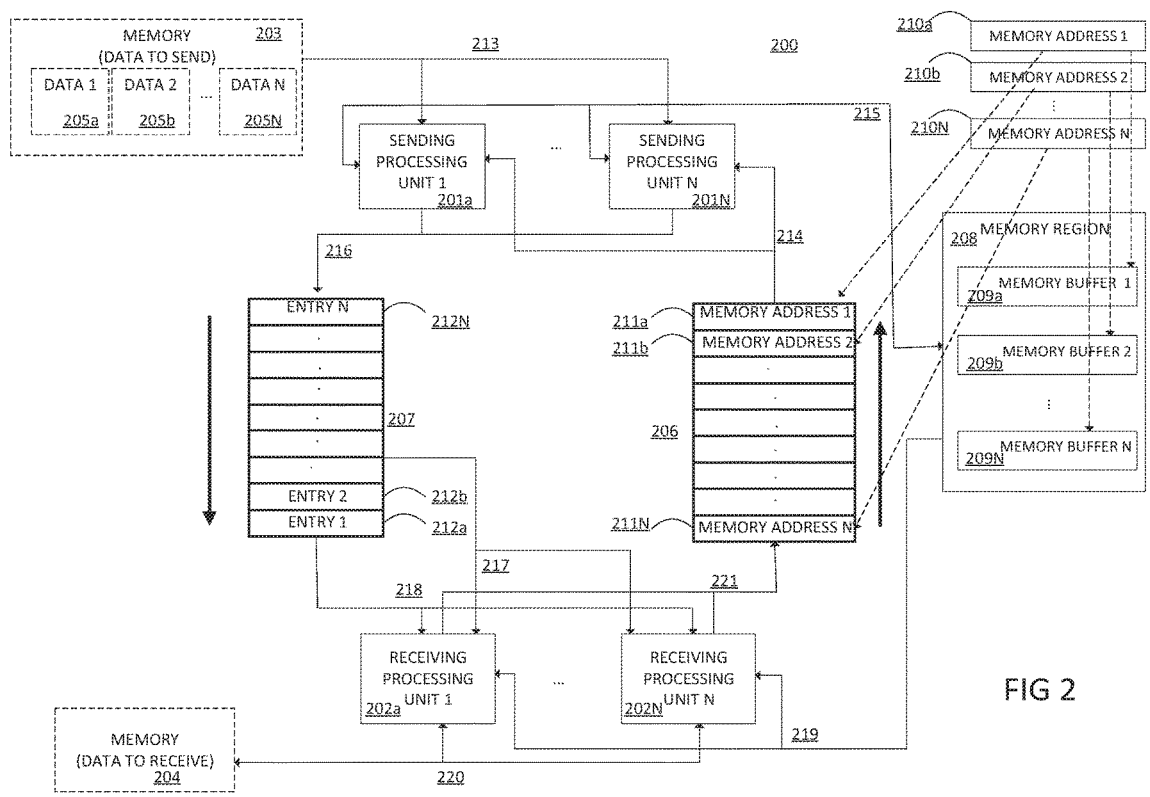
FIG. 2 is a block diagram of another example of a system for sending data from a plurality of sending processing units to a plurality of receiving processing units, the system including 2 FIFO buffers and a commonly accessible memory region.

FIG. 2 is a block diagram of another example of a system 200 for sending a plurality of data from a plurality of sending processing units to a plurality of receiving processing units. The example of the system 200 of FIG. 2 corresponds to the example system 100 of FIG. 1 including a plurality of data 205a-205N, in which "N" represents an integer value greater than one, to be sent from a plurality of sending processing units 201a-201N, in which "N" represents an integer value greater than one, to a plurality of receiving processing units 202a-202N, in which "N" represents an integer value greater than one, and with a commonly accessible memory region 208 comprising a plurality of memory buffers 209a-209N, in which "N" represents an integer value greater than one. Each memory buffer 209a-209N is associated with a corresponding single memory address 210a-210N, in which "N" represents an integer value greater than one, pointing to the corresponding memory buffer 209a-209N.

In this example, any of the plurality of receiving processing units 202a-202N divides the memory region 208 into memory buffers 209a-209N of fixed sizes defining the memory addresses 210a-210N pointing to each memory buffer 209a-209N. Each memory address 210a-210N is pre-populated in a different entry 211a-211N of the atomically accessible first FIFO buffer 206 by this receiving processing unit 202a-202N. The second FIFO buffer 207 comprises a plurality of entries 212a-212N, in which "N" represents an integer value greater than one. The two FIFO buffers 206-207 are read as an atomic access to a single location where the oldest written entry is read first.

In this example, the first FIFO buffer 206 is written by the receiving processing units 202a-201N and is read by the sending processing units 201a-201N, and the second FIFO buffer 207 is written by the sending processing units 201a-201N and is read by the receiving processing units 202a-202N.

When data exchange between the sending processing units 201a-201N and the receiving processing units 202a-202N is needed, one of the sending processing units 201a-201N, for example sending processing unit 201a, receives 213 a first data 205a to be sent to the receiving processing units 202a-202N from a memory 203. This memory 203, which in this example does not belong to the system 200, may be an external memory or an internal memory of a computing system, such a computer, server or the like, or may belong to the sending processing unit 201a itself. The memory region 208 may comprise a list with the memory addresses 210a-210N pointing to the corresponding memory buffers 209a-209N.

Then, the sending processing unit 201a reads 214 the oldest written entry 211a from the first FIFO buffer 206, said entry 211a containing the memory address 210a pointing to the available memory buffer 209a. The sending processing unit 201a then writes 215 data 205a in the corresponding memory buffer 209a up to its maximum size. After that, the sending processing unit 201 writes 216 the memory address 210a, with the size of the data stored in the memory buffer 209a, to the second FIFO buffer 207. At this point of the process, the sending processing unit 201a is free to carry out any other task including receiving additional data 205b-205N from the memory 203 to be sent to the receiving processing units 202a-202N. Simultaneously or sequentially to the operations carried out by the sending processing unit 201a, other sending processing units 201b-201N may be writing 215 additional data 205b-205N in additional free memory buffers 209b-209N and writing 216 corresponding memory addresses 210b-210N pointing to said free memory buffers 209b-209N to the second FIFO buffer 207.

When data is present in the second FIFO buffer 207 an interrupt signal in the second FIFO buffer 207 activates 217. This interrupt signal triggers any of the receiving processing units 202a-202N, for example the receiving processing unit 202a, to read 218 from the second FIFO buffer 207, to access the data stored in the memory buffer 209a pointed by the read memory address 210a and to write 220 the data in a memory 204. This memory 204, which in this example does not belong to the system 200, may be an external memory or an internal memory of a computing system, such a computer, server or the like, or may belong to the receiving processing unit 202a itself. The receiving processing unit 202a then writes 221 to the first FIFO buffer 206 with the memory address 210a. Then, the receiving processing unit 202a is free to carry out any other task, including reading additional data from the second FIFO buffer 207. When the second FIFO buffer 207 is empty, the interrupt signal is cleared or deactivated by the second FIFO buffer 207, but if the second FIFO buffer 207 stores additional data, the interrupt signal keeps activated triggering additional receiving processing units 202a-202N to sequentially or simultaneously read further data from the oldest written entry of the second FIFO buffer 207. Depending on the interrupt masking of the receiving processing units 202a-202N, one or another receiving processing unit 202a-202N will react to the interrupt signal to read the second FIFO buffer 207.

The functioning of the plurality of sending processing units 201a-201N is independent from the functioning of the plurality of receiving processing units 202a-202N, since the sending processing units 201a-201N may be writing additional memory addresses 210a-210N in the second FIFO buffer 207 pointing to different memory buffers 209a-209N that store additional data 205a-205N, at the same time that, the receiving processing units 202a-202N may be reading different data 205a-205N stored in memory buffers 209a-209N associated with memory addresses 210a-210N stored in the second FIFO buffer 207. This avoids the need to coordinate or synchronize the operation of the sending and receiving processing units avoiding locks and bottlenecks during execution of the data exchange process.

Similarly, in examples of systems with more than one sending processing unit sharing the FIFO buffers and the commonly accessible memory region, two or more sending processing units may be simultaneously or sequentially storing data in different memory buffers of the memory region as described in the example shown in FIG. 2. Thus, during runtime, when any sending processing unit needs to send data to the receiving processing units, each sending processing unit only needs to read the first FIFO buffer to retrieve a free memory address, to write the data to send to the corresponding memory buffer and to write the second FIFO buffer with the memory address. This common mechanism avoids locks and bottlenecks during execution of the data exchange process between the sending processing units to each other and makes communication less complex.

Moreover, in some examples, the stored data may be read by more than one receiving processing unit sharing the FIFO buffers and the memory region, two or more receiving processing units may be simultaneously or sequentially reading data from different memory buffers of the memory region as described in the example shown in FIG. 2. Thus, during runtime, when any receiving processing unit notices, by interrupt or any other mechanism, that the second FIFO buffer is not empty, the corresponding receiving processing unit only needs to read the second FIFO buffer to retrieve a full memory address to read the data from the corresponding memory buffer and to write the first FIFO buffer with the memory address indicating that the memory buffer is free. This common mechanism avoids locks and bottlenecks during execution of the data exchange process between the receiving processing units to each other and makes communication less complex.

Figure 3:
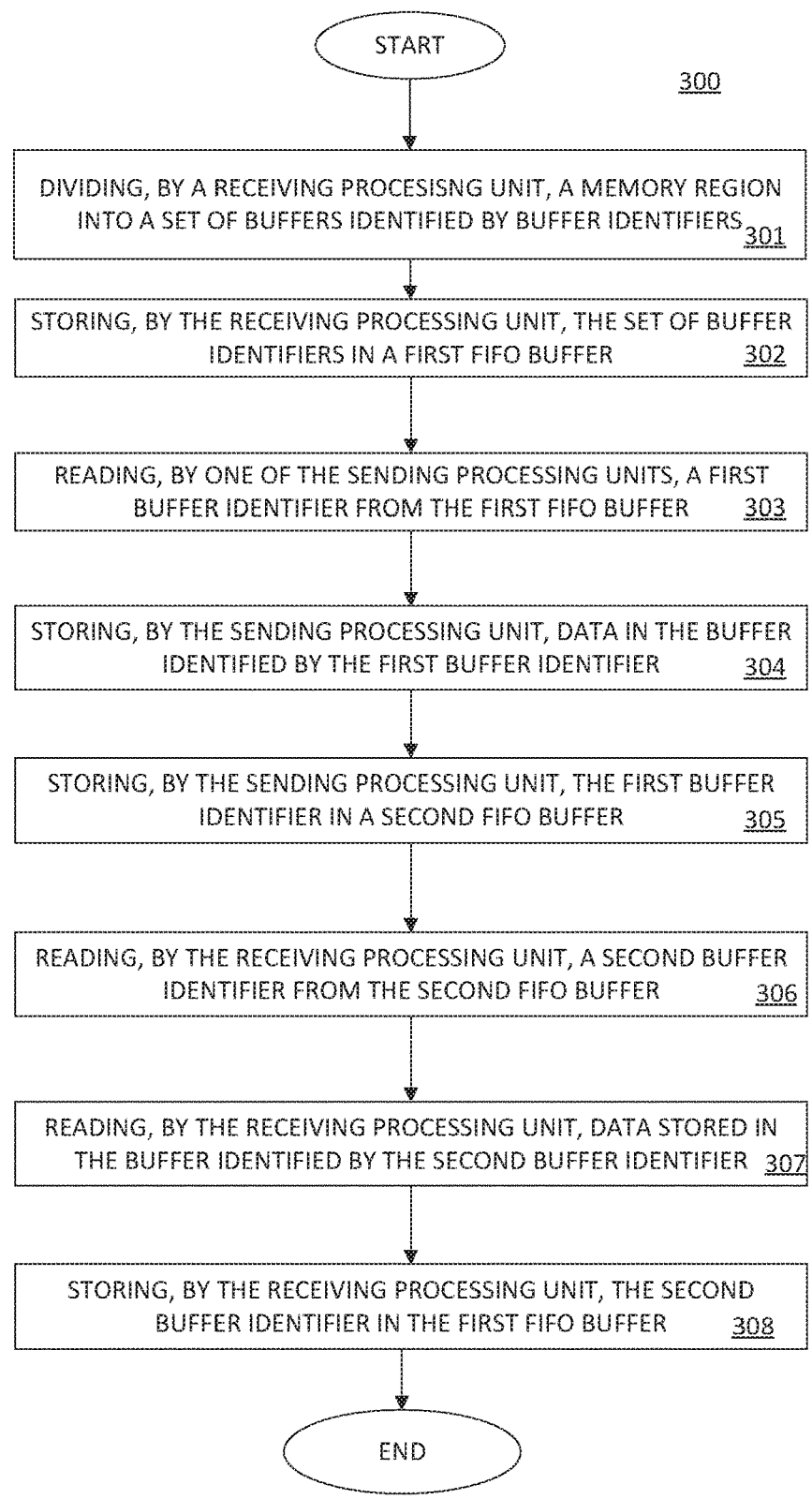
FIG. 3 is a flowchart of an example method for sending data from a plurality of sending processing units to a receiving processing unit.

FIG. 3 illustrates a flowchart of an example method 300 for sending data from a plurality of sending processing units to a single receiving processing unit, making reference to the components of the example system of FIG. 1. The example method 300 firstly comprises dividing 301, by the receiving processing unit 102, a memory region 107 into a plurality of memory buffers 108a-108N and assigning a buffer identifier 109a-109N to each one of the memory buffers 108a-108N. The receiving processing unit 102 stores 302 the set of buffer identifiers 109a-109N in a first FIFO buffer 105. Then, the sending processing unit 101a reads 303 a buffer identifier 109a from the first FIFO buffer 105. After reading 303 the buffer identifier 109a, the first processing unit 101 stores 304 the data in the memory buffer 108a pointed by the buffer identifier 109a and stores 305 said buffer identifier 109a in the second FIFO buffer 106.

When data is present in the second FIFO buffer 106, said second FIFO buffer 106 automatically activates an interrupt signal that triggers the receiving processing unit 102 to read 306 a second buffer identifier 109a from the oldest written entry of the second FIFO buffer 106. After that, the receiving processing unit 102 reads 307 the data stored in the memory buffer 108a pointed by the second buffer identifier 109a. The data read by the receiving processing unit 102 may be stored in an additional memory. Then, the receiving processing unit 102 stores 308 the second buffer identifier 109a in the first FIFO buffer 105. When the second FIFO buffer 106 is empty, the second FIFO buffer 106 deactivates the interrupt signal.

In some examples, when a new data needs to be sent, the sending processing unit 101a may read the same memory address 109a from the first FIFO buffer 105 and overwrite the same memory buffer 108a with this new data. In another example, the sending processing unit 101a may trigger specific cleaning hardware or software to delete the data previously stored in the buffer 108a before storing the new data. In another example, the receiving processing unit 102 may delete the data stored in the memory buffer 108a after reading said data, so the memory buffer 108a remains empty for further writing operations by the sending processing units 101a-101N. In this way, potential snooping is prevented.

In some other examples, each time a sending processing unit reads data from the first FIFO buffer, the first FIFO buffer may store an identifier of the sending processing unit with the buffer identifier that has been read. It allows the sending processing units to keep a record of the readings performed, and thus, to keep a record of what sending processing units store data in the memory buffers. In some other examples, the processing unit identifier may be stored together with the buffer identifier in the second FIFO buffer by the sending processing units, allowing the second FIFO buffer to generate an interrupt signal to the sending processing unit to which the processing unit identifier corresponds, when the respective buffer identifier is read from the second FIFO buffer by any of the sending processing units. Delivery confirmations or acknowledgment (ACK) transactions may be generated based on the record of the readings performed.

In some other examples, each time a receiving processing unit reads data from the second FIFO buffer, the second FIFO buffer may store an identifier of the receiving processing unit with the read buffer identifier that has been read. It allows the receiving processing units to keep a record of the readings performed, and thus, to keep a record of what receiving processing units read data from the memory buffers. In some other examples, the processing unit identifier may be stored together with the buffer identifier in the first FIFO buffer by the receiving processing units, allowing the first FIFO buffer to generate an interrupt signal to the receiving processing unit to which the processing unit identifier corresponds, when the respective buffer identifier is read from the first FIFO buffer by any of the sending processing units. Delivery confirmations or acknowledgment (ACK) transactions may be generated based on the record of the readings performed.

Figure 4A:
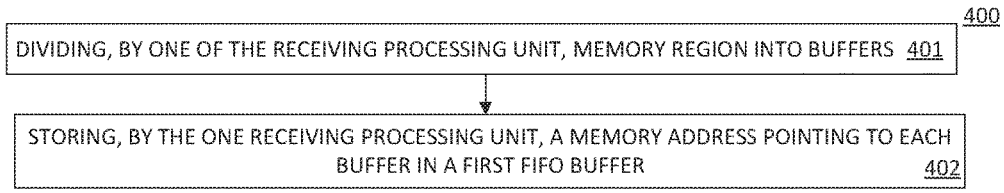
FIG. 4A is a flowchart of an example method for setting up the memory region and the first FIFO buffer for sending data from a plurality of sending processing units to a plurality of receiving processing units.
Figure 4B:
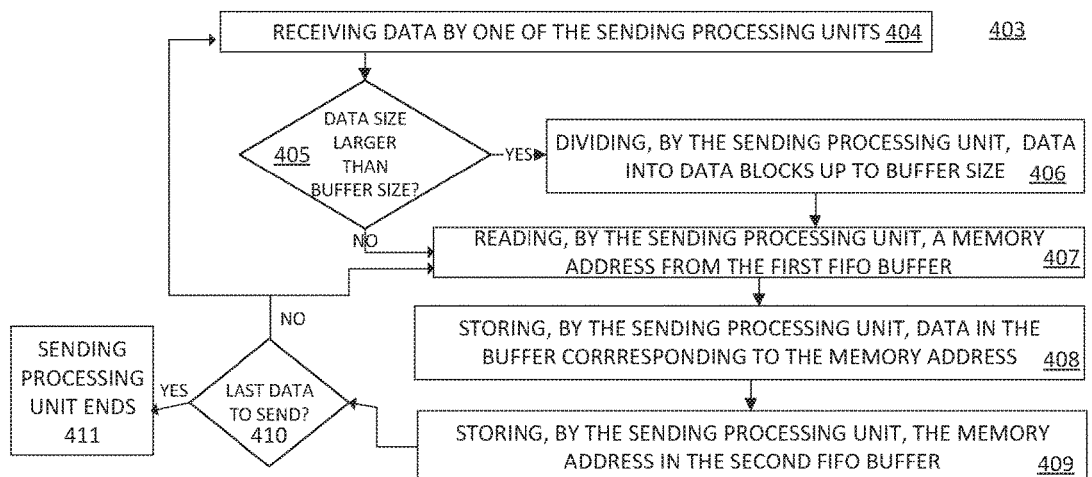
FIG. 4B is a flowchart of an example method for sending data from a plurality of sending processing units.
Figure 4C:
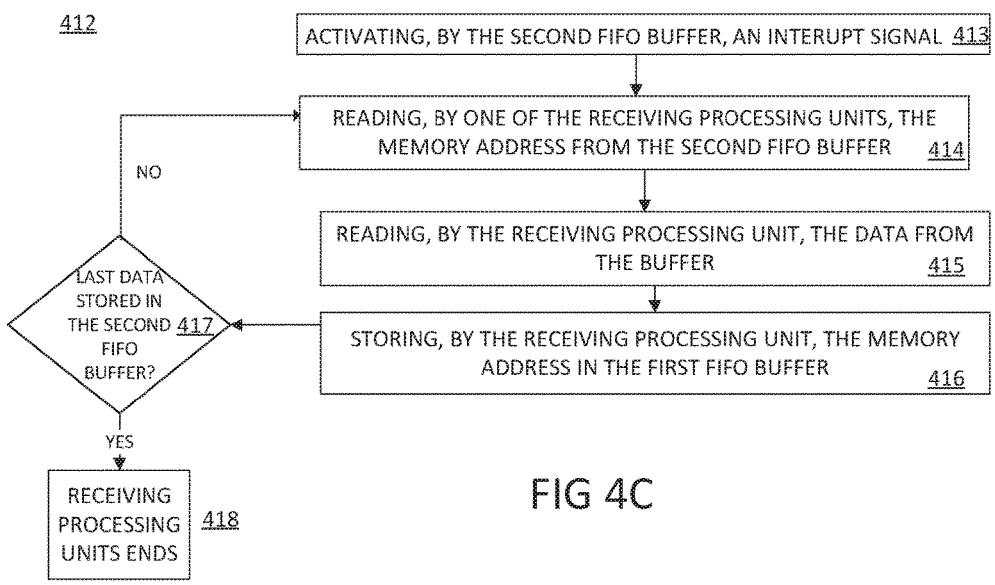
FIG. 4C is a flowchart of an example method for receiving data to a plurality of receiving processing units; and, FIG. 5 is a block diagram of an example of a system for sending data from a plurality of sending processing units to a plurality of receiving processing units, in which a machine-readable storage medium stores instructions to be performed by a plurality of sending processing units and a receiving processing unit.

FIG. 4A is a flowchart of an example method 400 for setting up the memory region and the first FIFO buffer for sending data from a plurality of sending processing units to a plurality of receiving processing units. FIG. 4B is a flowchart of an example method 403 for sending data from a plurality of sending processing units. FIG. 4C is a flowchart of an example method 412 for receiving data to a plurality of receiving processing unit. FIG. 4A, FIG. 4B and FIG. 4C make reference to the components of the example system of FIG. 2.

The example method 400 of FIG. 4A firstly comprises dividing 401, by one of the receiving processing units 201a-201N, the memory region 208 into memory buffers 209a-209N of fixed sizes. Each memory buffer 209a-209N has a memory address 210a-210N associated. In turn, each memory address 210a-210N is pre-populated in the first FIFO buffer 206 by the receiving processing unit 202.

The example method 403 of FIG. 4B includes dividing data into a plurality of data blocks of size equal or minor than a memory buffer maximum size. Such example method 403 comprises receiving 404, by one of the sending processing units 201a-201N, for example sending processing unit 201a, data 205a to be sent to the receiving processing units 202a-202N. Then, the sending processing unit 201a checks 405 whether the data 205a is larger than the pre-defined memory buffer maximum size. If the data is larger, then the sending processing unit 201a divides 406 data 205a into a plurality of data blocks up to the memory buffer maximum size. For example, if the memory buffer maximum size is 10 Mbytes and the data received has 35 Mbytes, the sending processing unit 201a may divide the data into 4 data blocks, three data blocks of 10 Mbytes and a fourth data block of 5 Mbytes.

After that, the sending processing unit 201a reads 407 a memory address 210a from the first FIFO buffer 206. Then, the sending processing unit 201a stores 408 the data 205a (or the first data block in which it has been previously divided) in the memory buffer 209a pointed by the memory address 210a read and stores 409 said memory address 210a with the data size in the second FIFO buffer 207. Then, the sending processing unit 201a checks 410 whether there is more data to be sent to the receiving processing units 202a-202N, said more data including other data blocks of the same data 205a. If there is no more data to be sent, the sending processing unit 201a ends 411 and then is free to carry out tasks other than data exchange with the receiving processing units 202a-202N. If there is more data (or other data blocks of data 205a) to be sent to the receiving processing units 202a-220N, the sending processing unit 201a or any other sending processing units 201b-201N may sequentially or simultaneously execute the previously described method steps 404-410 to send the next data or may sequentially or simultaneously execute the previously described method steps 407-410 to send the next data block.

The example method 412 of FIG. 4B comprises activating 413, by the second FIFO buffer 207, an interrupt signal when data is present in the second FIFO buffer 207. The interrupt signal triggers the receiving processing units 202a-202N to read said data from the second FIFO buffer 207.

When the interrupt signal is activated 413 by the second FIFO buffer 207, one of the plurality of receiving processing units 202a-202N, for example receiving processing unit 202a, reads 414 the memory address 210a from the oldest written entry of the second FIFO buffer 207. After that, the receiving process unit 202a reads 415 the data stored in the memory buffer 209a. Then, the receiving processing unit 202a stores 416 the memory address 210a in the first FIFO buffer 206. The receiving processing units 202a-202N then check 417 whether there is more data to be received that is stored in the second FIFO buffer 207 by checking if the interrupt signal is still activated. The second FIFO buffer 207 will keep said interrupt signal activated until the cited second FIFO buffer 207 is not empty to inform the receiving processing units 202a-202N of the existence of additional memory addresses 201a-201N pointing to additional memory buffers 209a-209N storing data 205b-205N to be read. Then, any of the receiving processing unit 202a-202N will re-execute the previously described method steps 414-416 to read the next data 205b. Depending on the interrupt masking of the receiving processing units 202a-202N, one or another receiving processing unit 202a-202N will react to the interrupt signal to read to the second FIFO buffer. If the second FIFO buffer is empty, the interrupt signal is automatically cleared or deactivated by the second FIFO buffer 207. Then, the second processing units 202a-202N end 418 and are free to carry out tasks other than data exchange with the sending processing units 201a-201N. In examples with more than one receiving processing unit receiving data from at least one sending processing unit, other receiving processing units may execute the previously described method steps 414-416 in a sequentially or simultaneously way to read the next data or data block from the corresponding memory buffer of the commonly accessible memory region.

FIG. 5 describes a block diagram of an example of a system 500 that is to execute a method for sending data from a plurality of sending processing units to a plurality of receiving processing units, in which a machine-readable storage medium stores instructions to be performed by the plurality of sending processing units and the plurality of receiving processing units. It should be understood that the system depicted in FIG. 5 may include additional components and that some of the components described herein may be removed or modified without departing from a scope of the system 500. It should be also understood that this example does not intend to be limiting and thus, the example system depicted in FIG. 5 may execute the method 500 for sending data from one single sending processing unit to a plurality of receiving processing units or from a plurality of sending processing units to a single receiving processing unit.

The system 500 is depicted as including a plurality of sending processing units 510a-510N, wherein N is an integer greater than one, a plurality of receiving processing units 511a-511N, wherein N is an integer greater than one, a first FIFO buffer 512, a second FIFO buffer 513 and a machine-readable storage medium 501. The processing units 510-511 may fetch, decode, and execute instructions, such as the instructions 502-509 stored on the machine-readable storage medium 501.

The processing units 510-511 execute the instructions 502-509 to divide 502, by any one of the receiving processing units 511a-511N, for example receiving processing unit 511a, a memory region into a plurality of memory buffers, wherein each memory buffer is identified by a unique buffer identifier; store 503, by the receiving processing unit 511a, the buffer identifiers in a first FIFO buffer; read 504, by any one of the sending processing units 510a-510N, for example sending processing unit 510a, a first buffer identifier from the first FIFO buffer 512; store 505, by the sending processing unit 510a, the data 514 in the memory buffer pointed by the first buffer identifier; store 506, by the sending processing unit 510a, said first buffer identifier in the second FIFO buffer 513; read 507, by any one of the receiving processing units 511a-511N, for example receiving processing unit 511N, a second buffer identifier from the second FIFO buffer 513; read 508, by the receiving processing unit 511N, the data 514 stored in the memory buffer, said memory buffer being pointed by the buffer identifier read from the second FIFO buffer 513; and store 509, by the receiving processing unit 511N, the memory buffer identifier in the first FIFO buffer 512. The data received 515 by the receiving processing unit 511N may be stored in an additional memory.

The machine-readable storage medium 501 may be any electronic, magnetic, optical, or other physical storage device that contains or stores executable instructions. Thus, the machine-readable storage medium 501 may be, for example, Random Access Memory (RAM), a storage device, an optical disc, and the like. In some implementations, the machine-readable storage medium 501 may be a non-transitory machine-readable storage medium, where the term "non-transitory" does not encompass transitory propagating signals.

In some other examples, there may be a first machine-readable storage medium storing instructions, for example instructions 504-506, to be performed by the plurality of sending processing units 510a-510N and a second machine-readable storage medium storing instructions, for example instructions 502,503,507-509, to be performed by to the plurality of receiving processing units 511a-511N. The first and the second machine-readable storage mediums may have access to the commonly shared memory region and to the first FIFO buffer 512 and to the second FIFO buffer 513.

The solution herein described, provides a luckless mechanism that allows each processing unit to operate atomically and independently from each other by avoiding the need to block or coordinate. It further allows for any processing unit to pass data to each other at any time and in any order removing the requirement for multiple accesses from a single processing unit for table lookup during memory buffer allocation.

It should be noted that FIGS. 3 to 5 illustrate actions taken by the sending processing units 101a-101N,201a-201N, 510a-510N and the receiving processing units 102,202a-202N,511a-511N in a single flow. However, it is not necessary for the sending and receiving processing units to synchronize on a per-message basis in this manner, and the steps of the example methods do not necessarily occur in this order; rather, they are merely shown in this order for purposes of clarity. All of the features disclosed in this specification (including any accompanying claims, abstract and drawings), or all of the elements of any method or process so disclosed, may be combined in any combination, except combinations where at least some of such features or elements are mutually exclusive.

Examples herein described presents many advantages, including the possibility of working with both similar processing units as well as dissimilar processing units; no locking of any resources at any time is required. Both FIFOs are read and written atomically. Any single FIFO buffer and memory buffer is owned, i.e. written or read by only one processing unit at a time; neither processing unit is required to block or coordinate to each other.

Examples herein described may work with more than one sending processing unit simultaneously or sequentially writing data in the commonly shared memory and one single receiving processing unit simultaneously or sequentially reading the data stored by the more than one sending processing unit. The solution also may work with more than one receiving processing unit simultaneously or sequentially reading data from the commonly shared memory, said data being previously stored by one single sending processing unit. The solution further may work with more than one sending processing unit simultaneously or sequentially writing data in the commonly shared memory and with more than one receiving processing unit simultaneously or sequentially reading data from the commonly shared memory, said data being previously stored by the more than one sending processing unit. In any of these cases the sending and receiving processing units only need sharing the memory region to store data and the two FIFO buffers to store the memory addresses associated to the memory buffers storing data.

The invention claimed is:

1. A system, comprising:
a memory device including a memory region accessible by a receiving processing unit and a plurality of sending processing units, the memory region including a set of memory buffers identified by a set of buffer identifiers;
a first First-In-First-Out (FIFO) buffer for communicating a first buffer identifier from the receiving processing unit to any one of the plurality of sending processing units, the first buffer identifier corresponding to a memory buffer available for use by the any one sending processing unit in sending data from the any one sending processing unit to the receiving processing unit; and
a second FIFO buffer for communicating a second buffer identifier to the receiving processing unit from any one of the plurality of the sending processing units, the second buffer identifier corresponding to a memory buffer containing data being sent from the one sending processing unit to the receiving unit.

2. The system of claim 1, wherein the receiving processing unit comprises a plurality of receiving processing units.

3. The system of claim 1, wherein the first FIFO buffer comprises a first notification generation module to notify at least one of the sending processing units that there is at least one buffer identifier in the first FIFO buffer.

4. The system of claim 1, wherein the second FIFO buffer comprises a second notification generation module to notify the receiving processing unit that there is at least one buffer identifier to be read from the second FIFO buffer.

5. The system of claim 1, wherein the buffer identifiers comprise at least one of a memory address or a memory offset.

6. The system of claim 1, wherein each one of the first and second FIFO buffers comprises at least one of:
 a first register storing a maximum number of entries of the respective first and second FIFO buffer;
 a second register storing a number of entries in the respective first and second FIFO buffer currently storing a buffer identifier; and
 a combination thereof.

7. The system of claim 1, wherein each memory buffer of the set of memory buffers comprises a buffer size register storing the maximum size of the memory buffer.

8. The system of claim 1, wherein the second buffer identifier comprises a size of the data contained in the memory buffer.

9. The system of claim 1, wherein each one of the first and second buffer identifiers comprises a key access code to allow access to the corresponding memory buffers by the plurality of sending processing units and by the receiving processing unit.

10. The system of claim 1, wherein the second FIFO buffer comprises an encoding module to encode the data stored in the second FIFO buffer and the receiving processing unit comprises a decoding module to decode the read data from the second FIFO buffer.

11. A method, comprising:
 dividing, by a receiving processing unit, a memory region of a memory device into a set of memory buffers identified by a set of buffer identifiers;
 storing, by the receiving processing unit, the set of buffer identifiers to a first First-In-First-Out (FIFO) buffer;
 reading, by a sending processing unit from a plurality of sending processing units, a first buffer identifier from the first FIFO buffer;
 storing, by the sending processing unit, data to the memory buffer identified by the first buffer identifier;
 storing, by the sending processing unit, the first buffer identifier to a second FIFO buffer;
 reading, by the receiving processing unit, a second buffer identifier from the second FIFO buffer;
 reading, by the receiving processing unit, the data stored in the memory buffer identified by the second buffer identifier; and
 storing, by the receiving processing unit, the second buffer identifier to the first FIFO buffer.

12. The method of claim 11 comprising notifying, by the first FIFO buffer, at least one of the sending processing units that there is at least one buffer identifier in the first FIFO buffer.

13. The method of claim 11, comprising notifying, by the second FIFO buffer, to the receiving processing unit that there is at least one buffer identifier to be read from the second FIFO buffer.

14. The method of claim 11, wherein storing the set of buffer identifiers in the first FIFO buffer comprises storing, by the receiving processing unit, each buffer identifier with a maximum size of the corresponding memory buffer in the first FIFO buffer.

15. The method of claim 11, wherein storing the first buffer identifier in the second FIFO buffer comprises storing, by the sending processing unit, each first buffer identifier with a size of the data stored in the corresponding memory buffer.

16. The method of claim 11, wherein the receiving processing unit comprises a plurality of receiving processing units.

17. The method of claim 11, wherein the plurality of sending processing units and the receiving processing unit communicate with the first FIFO buffer, the second FIFO buffer and the memory region by a remote access connection or by a proxy access connection.

18. The method of claim 11, wherein:
 in response to reading the first buffer identifier by one of the sending processing units, the first FIFO buffer stores an identifier of the one sending processing unit with the first buffer identifier and the one sending processing unit stores the first buffer identifier together with the identifier of the one sending processing unit in the second FIFO buffer, and
 in response to reading, by the receiving processing unit, the second buffer identifier from the second FIFO buffer, the second FIFO buffer triggers an interrupt signal to the one sending processing unit to which the identifier corresponds.

19. The method of claim 11, wherein:
 in response to reading the second buffer identifier by one of the receiving processing units, the second FIFO buffer stores an identifier of the one receiving processing unit with the second buffer identifier and the one receiving processing unit stores the second buffer identifier together with the identifier of the one receiving processing unit in the first FIFO buffer, and
 in response to reading, by one of the sending processing units, the first buffer identifier from the first FIFO buffer, the first FIFO buffer triggers an interrupt signal to the one receiving processing unit to which the identifier corresponds.

20. A non-transitory machine-readable storage medium storing a set of instructions executable by a plurality of sending processing units and a plurality of receiving processing units to cause:
 a receiving processing unit from the plurality of receiving units to divide a memory region of a memory device into a set of memory buffers identified by a set of buffer identifiers;
 the receiving processing unit to store the set of buffer identifiers to a first First-In-First-Out (FIFO) buffer;
 a sending processing unit from a plurality of sending processing units to read a first buffer identifier from the first FIFO buffer;
 the sending processing unit to store data to the memory buffer identified by the first buffer identifier;
 the sending processing unit to store the first buffer identifier to a second FIFO buffer;
 the receiving processing unit to read a second buffer identifier from the second FIFO buffer;
 the receiving processing unit to read the data stored in the memory buffer identified by the second buffer identifier; and the receiving processing unit to store the second buffer identifier to the first FIFO buffer.

\* \* \* \* \*